United States Patent [19]

Liu et al.

[11] Patent Number: 5,318,862
[45] Date of Patent: Jun. 7, 1994

[54] BIFUNCTIONAL GAS DIFFUSION ELECTRODES EMPLOYING WETTABLE, NON-WETTABLE LAYERED STRUCTURE USING THE MUD-CAKING CONCEPT

[75] Inventors: Chia-Tsun Liu; John F. Jackovitz, both of Monroeville, Pa.

[73] Assignee: Westinghouse Electric Corp., Pittsburgh, Pa.

[21] Appl. No.: 124,874

[22] Filed: Sep. 22, 1993

[51] Int. Cl.$^5$ ............................................ H01M 4/86
[52] U.S. Cl. ..................................... 429/27; 429/42
[58] Field of Search .................. 429/27, 40, 42, 44

[56] References Cited

U.S. PATENT DOCUMENTS

| | | |
|---|---|---|
| 3,423,247 | 1/1969 | Darland, Jr. et al. |
| 3,580,824 | 5/1971 | Currey et al. |
| 3,977,901 | 8/1976 | Buzzelli |
| 4,091,176 | 5/1978 | Alfenaar ............................. 429/40 |
| 4,152,489 | 5/1979 | Chottiner |
| 4,341,848 | 7/1982 | Liu et al. |
| 4,409,301 | 10/1983 | Angerer et al. .................... 429/27 |
| 4,444,852 | 4/1984 | Liu et al. |
| 4,448,856 | 5/1984 | Zuckerbrud et al. ............. 429/44 X |

Primary Examiner—Anthony Skapars
Attorney, Agent, or Firm—D. Schron

[57] ABSTRACT

A bifunctional gas diffusion electrode used in an electrochemical energy cell wherein a multi-ply composite layer containing an embedded metal screen current collector provides electrical power via the reduction of oxygen from air in the presence of an electrolyte and a catalyst. The electrode stores electrical power via the evolution of oxygen in the presence of an electrolyte and another catalyst. More than one composite layer may be used. Each ply of any particular composite layer is made of carbon-containing material of varying wettability and a fluorocarbon material. Each hydrophobic central ply contain a metal screen current collector. These central plies are prepared in a way to foster fissuring throughout the ply. Such fissuring, along with a hydrophilic impregnate forced into these fissures, permits controlled electrolyte penetration of the hydrophobic ply. Hydrophilic end plies sandwich the central ply and produce a large surface area for catalyzed oxygen reduction during the cell discharge cycle or catalyzed oxygen generation during cell charge cycle.

22 Claims, 2 Drawing Sheets

BIFUNCTIONAL GAS DIFFUSION ELECTRODES EMPLOYING WETTABLE, NON-WETTABLE LAYERED STRUCTURE USING THE MUD-CAKING CONCEPT

BACKGROUND OF THE INVENTION

1. Field of the Invention

This invention relates to electrodes, in particular gas diffusion electrodes, and especially to bifunctional gas diffusion electrodes, having an improved structure which permits them to operate with increased power generation over a prolonged life span.

2. Description of the Prior Art

Bifunctional gas diffusion electrodes for metal/air batteries generally consist of three components. These components are a hydrophobic layer which permits air passage while retaining electrolyte, a dual component active layer attached thereto containing a catalytic active paste material, and a plurality of porous fiber metal current collectors in which the active paste is contained, such as shown in Chottiner et al. in U.S. Pat. No. 4,152,489.

The active paste material usually has an oxygen absorption/reduction catalyzed carbon (C) having a total surface area from 30 to 1500 square meters per gram ($m^2/gm$), a suitable catalyst such as silver (Ag) for oxygen reduction and decomposition of intermediate reaction components, an oxygen evolution metal-containing additive such as tungsten sulfide ($WS_2$) or tungsten carbide (WC) coated with 1 to 20 weight percent (wt.%) cobalt (Co), and a dispersion of polytetrafluoroethylene (PTFE) as a bonding/non-wetting material, as taught by Chottiner et al. in U.S. Pat. No. 4,152,489, and Buzzelli in U.S. Pat. No. 3,977,901. This mixture is blended with deionized water to form the active paste.

Due to the relatively high viscosity of the active paste, it has been necessary to apply considerable force during the pasting operation in order to get reasonable loading of the porous fiber metal screen with active paste. This force generally tends to compress and compact the screen structure to provide only about 40% to 65% porous screen, and prevents the paste from filling all of the original screen pores or voids.

The ideal incorporation of the catalytic paste into the screen would be to have about 95% to 100% of the screen pores filled. This would produce the highest number of active sites within the confines of the screen, with all active sites very close to the metal collecting fibers. It is also advantageous to have most of the active material within the screen, rather than forming a separate composite layer held or attached to the screen structure. Thick coatings of catalytic paste on the surface of the screen result in many of the active sites being far removed from the nickel fibers with electrons from these sites having to traverse a high resistance path to each current collector.

For good cell performance, the electrolyte must penetrate into the electrode sufficiently to reach the interior surfaces, and contact air or oxygen in the presence of a catalyst. The electrode must at the same time be sufficiently electrolyte-repellent to prevent electrolyte flooding of the electrode pores. Electrolyte flooding can be a problem with gas diffusion electrodes, and while the Chottiner et al. structure, and the Buzzelli active paste composition, solve the problem to an acceptable degree by providing stable electrical characteristics for about 100 cycles, more improved structures or compositions would be highly desirable, especially if electrolyte flooding could be completely eliminated. Another problem with gas diffusion electrodes is the progressive dissolution of the discharge/oxygen reduction catalyst, particularly Ag, into the electrode during charging.

Typically, such electrodes have third cycle charging potentials of about 550 mV to 610 mV compared to a Hg/HgO reference electrode. Values of about 550 mV to 585 mV have been achieved using major amounts of oxygen evolution material, such as tungsten carbide (WC), adding substantially to the cost and weight of the electrode. It is desirable to lower this charging voltage, to conserve energy, and to reduce the amount of silver catalyst that dissolves in the electrolyte at that voltage. It is also desirable to reduce the cost and weight of the above described electrodes while maintaining a proper balance of electrolyte permeability.

Darland, Jr. et al. in U.S. Pat. No. 3,423,247 attempted to solve electrolyte flooding of gas diffusion electrodes in fuel cells by providing two zones in the electrolyte structure. One zone, next to the air supply, consists of low-surface-area, large particles having high wet-proofing and no catalyst, containing from about 30 to 70 volume percent PTFE. The other zone, next to the electrolyte, consists of high surface area, small, catalyzed particles operating in a wetted condition. A single mesh current collector is attached to the zone next to the air supply. Such a configuration is still not completely effective, however, and a need remains for a maximum output, minimum flooding electrode for use in metal/air batteries and fuel cells.

In another art area relating to graphite anodes used in the electrolysis of aqueous alkalide metal halide electrolyte, Currey et al., in U.S. Pat. No. 3,580,824, shows vacuum-impregnating a graphite anode with ferric or ferrous chloride, nitrate, acetate, or formate, and then calcining the impregnated graphite for up to four hours at 800° C. to 2000° C., in an inert atmosphere, to produce varying amounts of alpha iron and alpha-$Fe_2O_3$, in-situ in the graphite pores. The iron is used partly as a substitute for oil impregnate, to reduce the consumption of the anode during cell operation, the iron apparently preventing wetting of the interior of the anode by the liquid electrolyte. Such a process would make the electrode substantially electrolyte-impermeable.

Liu, et al., in U.S. Pat. No. 4,341,848, attempted to reduce weight and cost by using elemental iron to replace some or all of the oxygen evolution material. In addition, that gas diffusion electrode maintains a proper balance of electrolyte permeability because the elemental iron provides an electrolyte storage surface. Also, that bifunctional gas diffusion electrode possesses hydrophilic layers, including integrally-contained current collectors, which are press-bonded to hydrophobic layers. The hydrophobic layers are impervious to the electrolyte but capable of permitting gas and oxygen diffusion. However, although the oxygen evolution catalysts in that electrode do not change composition with time, the elemental iron has limited stability during long-term bifunctional cycling. This change in composition limits the life of that electrode due to electrolyte leakage.

Liu, et al., in U.S. Pat. No. 4,444,852, attempted to reduce electrolyte flooding and increase battery output by utilizing at least two bonded, catalytically active material sections in the electrode active layer, each comprising active material preferably bonded to, and at least partially impregnating, a supporting porous metal current collector. Furthermore, each active metal section is equally electrochemically active, and contains catalyst and a blend of hydrophobic agglomerates and hydrophilic agglomerates. However, the two bonded layers do not include a fissured, mud-caked or layer which has been baked to remove nearly all of the surfactant, thereby producing a barrier which is at least partially hydrophobic, and which prevents early electrolyte flooding and electrode failure.

SUMMARY OF THE INVENTION

The invention provides for a rechargeable metal/air electrochemical energy storage cell that includes a bifunctional gas diffusion electrode. The bifunctional gas diffusion electrode of this invention contains at least one multi-ply composite layer. Each composite layer has two end plies between which is interposed a hydrophobic central ply. A metal screen current collector is embedded within the hydrophobic central ply. As described in detail herein, the central ply is formed by filling a current collector, preferably an expanded metal screen made of nickel, with a hydrophobic admixture.

Electrolyte penetration is permitted but controlled through both hydrophobic and hydrophilic plies, each by a different mechanism. Electrolyte wetting of hydrophobic plies is controlled by varying both the extent of fissuring induced in the hydrophobic admixture pasted into the current collector, and the high-surface-area carbon content of a hydrophilic material introduced within these fissures. Electrolyte penetration of hydrophilic plies is controlled by regulating the amount of high-surface-area carbon in each ply.

The hydrophobic central ply is sandwiched by two layers whose capacity to be wetted with electrolyte may range from hydrophilic to hydrophobic, depending upon the overall number of composite layers in the electrode, and the orientation of the composite layers with respect to the air and electrolyte. Hydrophilicity of the end plies is progressively diminished as the particular ply's position approaches the air side of the electrode. The outermost ply which contacts the air is completely hydrophobic and fissure-free.

Both hydrophobic and hydrophilic materials contain low-surface-area carbon and a binding/non-wetting agent, typically PTFE. However, hydrophilic materials also contain high-surface-area carbon, a charge catalyst package and a discharge catalyst package. The charge catalyst package catalyzes oxygen evolution, limits intermediate reaction products, reduces carbon corrosion of the electrode during charging, and acts as a low oxygen over-voltage metal additive. The discharge catalyst package facilitates the reduction of oxygen and limits the generation of intermediate reaction products.

During the discharge of electrical power from the cell, air penetrates the outer surface of the electrode by diffusion to a three-phase, electrochemically active area where catalyzed solid carbon particles, liquid electrolyte and oxygen meet.

The bifunctional gas diffusion electrode herein greatly increases the total electrochemically active area within the electrode, yielding greater power generation and longer cell life.

DETAILED DESCRIPTION OF SOME PREFERRED EMBODIMENTS

Figure 1:
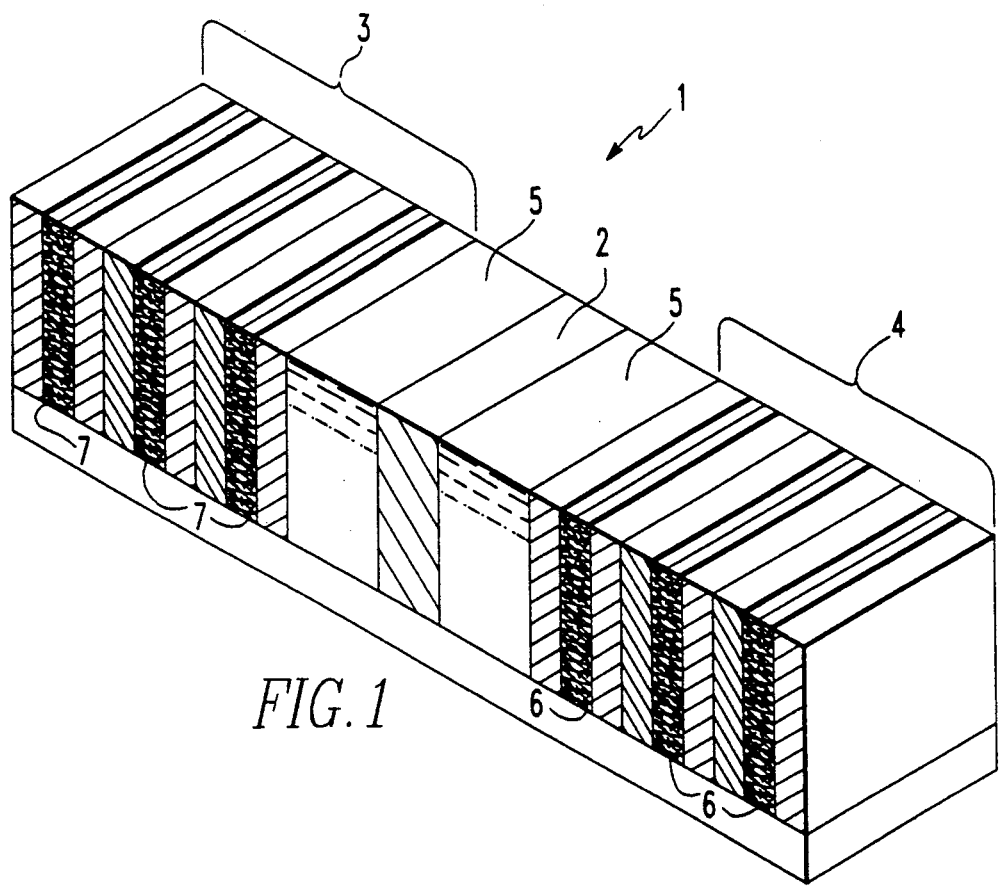
FIG. 1 is an isometric view, in partial section of one embodiment of an metal/air battery of the present invention.

The embodiments of the bifunctional gas diffusion electrode described herein are used in electrochemical energy cell applications, such as, for example, metal/air fuel cells and metal/air batteries. For purposes of illustration, an application employing a bifunctional gas diffusion electrode in a metal/air battery is detailed herewith. Note that wettability is defined herein as the capacity of a material to be wetted by electrolyte and may range from highly hydrophilic to absolutely hydrophobic. Note also that, in the wettability continuum between these extrema, the terms hydrophilic and hydrophobic are both qualitative and relative.

The bifunctional gas diffusion electrode of this invention contains at least one multi-ply composite layer. Each composite layer has two end plies between which is interposed a hydrophobic central ply. A current collector, preferably an expanded metal screen, is embedded within the hydrophobic central ply. Electrolyte penetration is permitted but controlled through both hydrophobic and hydrophilic plies, each by a different mechanism. Electrolyte wetting of hydrophobic plies is controlled by varying both the extent of fissuring induced in the hydrophobic material, and the high-surface-area carbon content of a hydrophilic material introduced within these fissures. Because the fissures are analogous to the appearance of dried mud, the process used to prepare the fissured central ply is called "mud-caking." In general, electrolyte penetration of hydrophobic plies is directly proportional to the extent of mud-caking. Electrolyte penetration of hydrophilic plies is controlled by regulating the amount of high-surface-area carbon in each ply. In general, the greater the amount of high-surface-area carbon added to a hydrophilic ply, the greater electrolyte penetration of the ply.

During the fabrication of each central ply, a hydrophobic admixture is pasted into an expanded metal screen current collector and allowed to air dry. During air-drying, the hydrophobic admixture develops uniform fissures throughout the entire ply. The ply is then baked in an oven to complete fabrication of the ply. The fissures thus created are filled with a hydrophilic impregnate which has been sufficiently wetted with an organic dispersion agent, typically a non-ionic surfactant, to permit the material to thoroughly penetrate the fissures. This hydrophilic impregnate permits electrolyte to penetrate the hydrophobic central layer in a controlled manner, thereby ionically connecting those end plies which are separated by the central ply, while simultaneously permitting the diffusion of oxygen through the hydrophobic ply into adjacent electrochemically active areas of the electrode.

Once the central ply is thus prepared, it is coated on both sides by pastes which may have different wettability. The three-ply structure then is placed in an oven to dry. Each of the resulting end plies has a degree of wettability which may vary by degree from that of any other end ply, depending upon the overall number of composite layers in the electrode, and the orientation of the composite layers with respect to the air and electrolyte. In general, the ply closest to the electrolyte reservoir is the most hydrophilic. Hydrophilicity of end plies is progressively diminished as the particular ply's position approaches the air side of the electrode. To prevent electrolyte leakage from the metal/air cell, the outermost ply which contacts the air is completely hydrophobic and fissure-free.

Both hydrophobic and hydrophilic materials contain low-surface-area carbon and a binding/non wetting agent, typically PTFE. However, hydrophobic materials also contain high-surface-area carbon, a charge catalyst package and a discharge catalyst package. While the low-surface-area carbon possesses a total surface area of between 30 and 300 $m^2/gm$, and typically 60 $m^2/gm$, the high-surface-area carbon possesses a total surface area of between 1000 and 1500 $m^2/gm$, typically 1200 $m^2/gm$. The high-surface-area carbon affords rapid wetting of the material with electrolyte and facilitates the electrochemical formation of the metal/air cell. In the embodiment described herein, the hydrophilic layers typically contain about 21% to 25% PTFE and the hydrophobic layers typically contain about 27% to 40% PTFE.

The charge catalyst package consists of oxygen evolution materials such as NiS, $FeWO_4$, and WC fuse-evolution sintered coated with about 1 to 20 wt % cobalt, preferably about 12 wt.%, and their mixtures. This blend catalyzes oxygen evolution, limits intermediate reaction products, reduces carbon corrosion of the electrode during charging, and acts as a low oxygen over voltage metal additive. The discharge catalyst package facilitates the reduction of oxygen and limits the generation of intermediate reaction products. The discharge catalyst, preferably finely divided Ag particles, is deposited upon the carbon particles through a thermal decomposition process.

During the discharge of electrical power from the cell, air penetrates the outer surface of the electrode by diffusion to a three-phase, electrochemically active area where the solid carbon particles, liquid electrolyte and oxygen meet. A catalyst may be present. The most effective interface is at the current collectors. The electrical current which is generated throughout the three-phase interfacial area is drawn away from the active area by the current collectors. During the charge cycle of the cell, oxygen is evolved from the electrolyte solution as facilitated by the charge catalyst package materials. Oxygen diffuses out of the cell via the pores in the hydrophobic material, similar to the way in which oxygen diffused in during the discharge cycle.

Other details, objects and advantages of the invention will become apparent as the following description of a present preferred embodiment thereof and a present preferred method of practicing the same proceeds. The accompanying drawings show presently preferred embodiments of the invention and a method of practicing the invention.

Turning to FIG. 1, metal/air cell 1 includes a metal electrode 2 fabricated from zinc, iron, cadmium, aluminum, or similar material, spaced apart from and between bifunctional gas diffusion electrodes 3 and 4. Metal/air cell 1 also includes an electrolyte 5 between and in contact with metal electrode 2 and bifunctional gas diffusion electrodes 3, 4. Electrolyte 5 is an alkali hydroxide, such as sodium hydroxide, lithium hydroxide, or preferably potassium hydroxide. During the discharge cycle of cell 1, current collectors 6, 7 extract electrical current from the electrochemically active sites within electrodes 3, 4. During cell 1 charging, collectors 6, 7 provide an electrical path into the active sites for the current needed to effect the charge recovery of cell 1.

Figure 2:
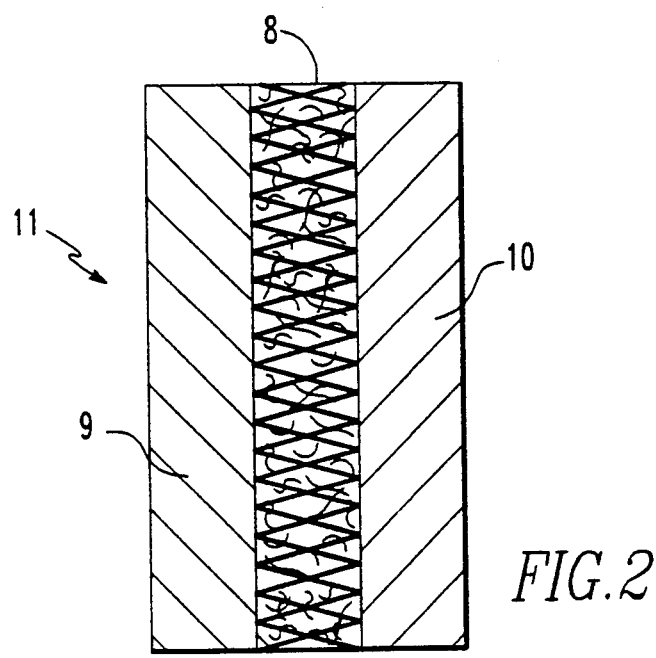
FIG. 2 is a side view of one composite layer of a present embodiment of the invention showing a central ply with embedded metal screen current collector, and two end plies.

In FIG. 2, hydrophobic central ply 8 is interposed between hydrophilic end plies 9 and 10 by covering both sides of ply 8 with material of variable wettability. Prior to forming end plies 9, 10 around central ply 8, a hydrophilic impregnate is introduced into fissures formed in central ply 8 as described below. The resulting three-ply composite layer 11 is baked in an oven at about 160° C. until dry. Hydrophilic plies 9, 10 of composite layer 11 contain both a charge catalyst package and a discharge catalyst package, together enabling the electrode to be truly bifunctional. Both charge and discharge catalyst materials are intermixed with the carbon, affording both catalyst packages the same surface area for reaction.

Typically, ply 8 is about 15 mils (0.015 inches) thick, and plies 9,10 have a thickness of about 5 mils to 10 mils, although 8 mils is preferred. In addition, the composition of plies 9,10 is about 54 wt.% C, 3 wt.% Ag, 7 wt.% $FeWO_4$, 7 wt.% of a blend of WC with about 12 wt.% Co, 7 wt.% NiS and 22 wt.% PTFE. However, the material comprising layer 9 may be either more or less hydrophilic than the material comprising layer 10, depending upon the overall number and orientation of composite layers with respect to the air and electrolyte. Generally, the end ply of any particular composite layer closest to the electrolyte side of the metal/air battery will be more hydrophilic than the end ply of that layer closest to the air side.

Certain combinations of carbon are preferred in the hydrophilic plies. In general, the greater the amount of high-surface-area carbon present in the blend, the more hydrophilic the material is. Conversely, the greater the amount of low-surface-area carbon present in the blend, the more hydrophobic the material is. Low-surface-area carbon has been found to be particularly effective to evolve oxygen without deleterious effects on the electrode. Preferably, such carbon is in a fluffy form comprising discrete particles in a chain-like structure having a low surface-area of about 30 to 300 $m^2/gm$, and typically 60 $m^2/gm$, such as acetylene black, or the product named Shawinigan, made by Chevron Chemical Co, Houston, Tex.

When only catalyzed low-surface-area carbon is used in the preparation of an electrode, however, the break-in time to achieve target performance can take as much as 15 cycles for the electrode to achieve a moderate level of performance. In U.S. Pat. No. 4,341,848, a blend of low- and high-surface-area carbon was found to improve performance, with low surface-area carbon being predominant by comprising 65 wt.% to 100 wt.% of the carbon used. Such high-surface-area carbon is likewise fluffy but instead is composed of discrete particles having a surface area of between 1,000 to 1,500

$m^2/gm$ and typically 1,200 $m^2/gm$, such as lamp black, or the product named Ketjen, made by Cabot Carbon Corp. However, when the weight percentage of the high surface area carbon exceeds 10 wt.% of the carbon blend, carbon corrosion of the electrode has been observed. In the present invention, the addition of up to 5 wt.% of high-surface-area carbon to low-surface-area carbon effects rapid wetting of hydrophilic plies 9, 10 with electrolyte while maximizing electrode life and is preferred. The degree of hydrophilicity of plies 9, 10 is controlled by varying the ratio of high-surface-area carbon to low-surface-area carbon.

For the carbon to be electrochemically active, catalysts should be bonded to, or blended with, the carbon particles. The charge catalyst package facilitates oxygen evolution during charging in aqueous alkaline electrolyte, according to the reaction $$4(OH)^- \rightarrow O_2 + 2 H_2O + 4 e^-$$

In one present preferred embodiment, the charge catalyst package is composed of an blend of carbon, NiS, FeWO$_4$, and WC fuse-sintered coated with 1 to 20 wt.% cobalt, preferably about 12 wt.%, and their mixtures. Each of these materials may contain up to 15 wt.% of the total material used in the layer. The charge catalyst package is added to catalyze oxygen evolution, limit intermediate reaction products, reduce carbon corrosion of the electrode during the charging cycle, and serve as a low oxygen over-voltage metal additive. In addition, metal sulfides, such as NiS, serve as a Ag protection additive, useful when Ag is used as a discharge catalyst.

The discharge catalyst package facilitates the reduction of oxygen and the reduction of intermediate reaction products, typically perhydroxides. Useful catalysts for this purpose include Ag, which is preferred, nickel, platinum or other suitable catalyst depending upon the electrode application. When Ag is the catalyst, finely divided Ag particles are placed on the carbon particles by a thermal decomposition process. In that process, the carbon particles that are to be catalyzed are wetted by mixing with a silver salt solution, such as AgNO$_3$. The wetted carbon particles are heated in nitrogen gas to 500° C., leaving silver particles on and in the carbon particles. This discharge catalyst can contain up to 10 wt.% of the total blend, although a composition of about 5 wt.% Ag, or 2 mg Ag/cm$^2$, is preferred.

To bond the carbon and catalyst blends in hydrophilic plies 9, 10 together and to control flooding of the electrode by the electrolyte, a bonding/non-wetting agent is required. This bonding/non-wetting agent is typically a fluorocarbon particle dispersion. In one embodiment of the present invention, PTFE is the preferred fluorocarbon material. Further, to reduce the surface tension between the fluorocarbon particles and other materials a dispersion agent is added. Non-ionic surfactants are preferred as dispersion agents because they decompose at hot-pressing temperatures with no residue. Although anionic surfactants can be useful dispersion agents, they leave undesirable residues after thermal decomposition, and are not preferred. Because cationic surfactants bear a negative charge, they repel electrolyte penetration, and may not be particularly useful. In addition, because cationic surfactants also leave undesirable residues after thermal decomposition, they are not preferred.

Figure 3:
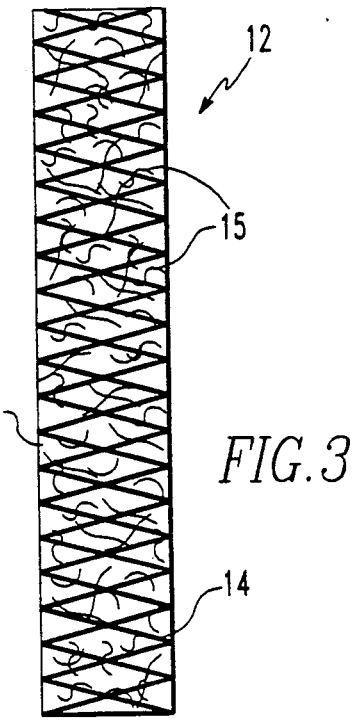
FIG. 3 is a side view of one central ply showing fissured hydrophobic material with embedded metal screen current collector.

In FIG. 3, electrolyte penetration of hydrophobic ply 12 is controlled using the concept of mud-caking. The extent of mud-caking is controlled by drying time and drying temperature. In general, numerous, fine mud-cake fissures develop as the mixture is allowed to air-dry slowly, near room temperature or lower. As drying temperatures increase, the mud-cake fissures become fewer but larger. In this embodiment, mud-caking occurs when hydrophobic admixture 13 is pressed into a current collector 14, which is preferably an expanded metal screen made of nickel, and is permitted to air dry overnight, preferably at room temperature, thus causing hydrophobic admixture 13 to uniformly mud-cake or develop fissures 15. Ply 12 is dried further at 80° C. for two hours and then baked at 200° C. for 16 hours. Baking at 200° C. may contribute to the generally hydrophobic character of ply 12 by causing thermal decomposition of the surfactant which may be a component of admixture 13.

Ply 12 permits oxygen to diffuse through it and into other plies and layers of the electrode. Similarly, numerous fissures 15 permit electrolyte to penetrate layers of the gas diffusion electrode and create a larger, more electrochemically active surface area. A hydrophilic impregnate is introduced under pressure within fissures 15 of hydrophobic ply 12 to ensure continuity of electrolyte distribution, and this forms an ionic connection between the hydrophilic plies separated by ply 12. This method permits disseminated but controlled electrolyte penetration, thus ensuring a maximal three-phase interfacial contact of electrolyte, catalyst and oxygen without causing electrolyte flooding. The hydrophilic impregnate contains a catalyzed, high-surface-area-carbon-rich carbon blend with sufficient dispersion agents to promote thorough penetration of the paste into fissures 15. In the hydrophilic impregnate, it is preferred that the amount of high-surface-area carbon is 0% to 10%, the amount of low-surface-area carbon is 90% to 100%, and the amount of surfactant is less than 1%. Furthermore, the charge catalyst blend is 10% to 15% FeWO$_4$, 10% to 15% NiS, and 10% to 15% WC with about 12 wt.% Co, while the amount of discharge catalyst is 5% to 10% Ag. This paste is introduced into the fissures 15 by pasting the hydrophilic impregnate into a formed, mud-caked hydrophobic ply 12 and subjecting it to about 2500 psi to 4000 psi pressure at about 300° C. to 325° C. for approximately 10 to 15 minutes. The dispersion agent is also used to facilitate the distribution of the hydrophilic impregnate throughout the fissures 15 of hydrophobic ply 12.

Figure 4:
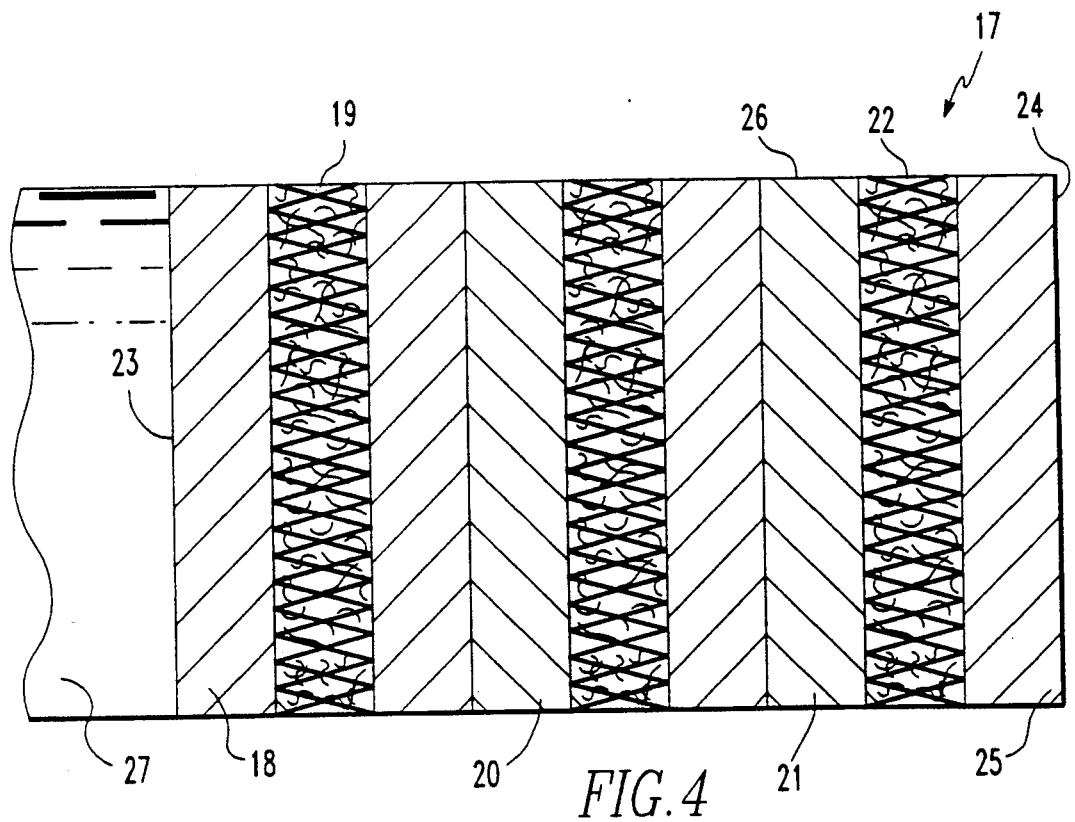
FIG. 4 is a side view of one embodiment of a bifunctional gas diffusion electrode showing three composite layers.

As shown in FIG. 4, it is preferred to provide bifunctional gas diffusion electrode 17 with three composite multi-ply layers, namely electrolyte-side composite layer 18, intermediate composite layer 20, and air-side composite layer 21. The extent of mud-caking is controlled so this mud-caking, or fissuring, is extensive in hydrophobic central ply 19 of layer 18, which is closest to electrolyte side surface 23 of electrode 17, and is minimal in the hydrophobic central ply 22 of layer 21 which is closest to air side surface 24 of electrode 17. Exterior ply 25 of composite layer 21, which forms the air side surface 24 of electrode 17, contains only uncatalyzed low-surface-area carbon blended with PTFE. Ply 25 is thus impenetrable to electrolyte 26 while permitting diffusion of air and oxygen into the composite layers 18, 20, 21 of electrode 17. To prevent electrolyte leakage from the metal/air cell, the ply 25, which contacts the air, is completely hydrophobic and fissure-free. A typical composition for ply 25 is about 72 wt.% carbon and 28 wt.% PTFE. In an embodiment of electrode 17 with a single composite layer, that single layer is preferred to be air-side composite layer 21. Layer 21 is composed of completely hydrophobic and fissure-free exterior ply 25, hydrophobic central ply 22 and interior ply 26. Although primarily hydrophobic, plies 22 and 26 are at least partially wettable, thereby providing electrolyte 27 to the electrochemically active sites within layer 21.

It is also preferred to provide gas diffusion electrode 17 where the amount of catalyzed high-surface-area carbon decreases, thereby increasing hydrophobicity, as the layers are assembled in order from electrolyte side surface 23 to air side surface 24. This gradation permits rapid yet controlled wetting and, therefore, rapid electrochemical formation of the electrode to be achieved while maximizing electrode life.

Once the composite layers have been assembled in the desired order, the composite layers are cold-pressed together at low pressure, preferably about 100 psi, to form an integral mass. The composite structure is allowed to dry at room temperature. Finally, the composite structure is hot-pressed at about 300° C. to 325° C. and about 2000 psi for about 10 minutes, thereby allowing the PTFE to flow and tightly binding together the carbon, PTFE and metal screens. Hot-pressing of air side 24 is effected at about 300° C., while the electrolyte side surface 23 is hot pressed at about 270° C. By using the configuration of FIG. 4, the three phase interfacial contact of electrolyte, oxygen and catalyst is maximized throughout the entire active layer. This maximized active surface area permits increased power generation by this gas diffusion electrode. Due to the controlled, uniform mud-caking of the hydrophobic central plies, current is generated generally uniformly throughout the electrode while electrolyte penetration is controlled, thus providing stable electrical characteristics and prolonging the life of the metal/air electrochemical energy cell which uses the electrode. In addition, this configuration may be rechargeable.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the invention which is to be given the full breadth of the following claims and any and all embodiments thereof.

We claim:
1. A bifunctional gas diffusion electrode used in an electrochemical energy cell such electrode having at least one primary composite layer permeable to an electrolyte each of such primary layer comprising:
 (a) a first hydrophobic ply having low-surface-area carbon particles and having a discharge catalyst and having an oxygen evolution catalyst and having a bonding/non-wetting agent;
 (b) a second hydrophobic ply having low-surface-area carbon particles and having a bonding/non-wetting agent; and
 (c) a third hydrophobic ply interposed between said first and said second hydrophobic plies said third hydrophobic ply having at least one current collector containing voids and having a hydrophobic admixture formed into said at least one current collector; and said admixture composed of
  i. low-surface-area carbon particles,
  ii. a discharge catalyst, and
  iii. a bonding/non-wetting agent.
2. The bifunctional gas diffusion electrode of claim 1 wherein said hydrophobic admixture in said third hydrophobic ply contains fissures.
3. The bifunctional gas diffusion electrode of claim 2 further comprising a hydrophilic impregnate contained in said fissures of said third hydrophobic ply; and said hydrophilic impregnate composed of
 (a) low-surface-area carbon particles,
 (b) high-surface-area carbon particles,
 (c) a discharge catalyst,
 (d) a bonding/non-wetting agent,
 (e) an oxygen evolution catalyst, and
 (f) an organic dispersion agent.
4. The bifunctional gas diffusion electrode of claim 3 wherein said at least one current collector is comprised of expanded metal.
5. The bifunctional gas diffusion electrode of claim 3 wherein said discharge catalyst is selected from a group consisting of silver and nickel and platinum.
6. The bifunctional gas diffusion electrode of claim 3 wherein said low oxygen over-voltage metal additive is selected from the group of materials consisting of nickel sulfide, a tungsten carbide and cobalt mixture, iron tungstate, and mixtures thereof.
7. The bifunctional gas diffusion electrode of claim 3 wherein said organic dispersion agent is a non-ionic surfactant.
8. The bifunctional gas diffusion electrode of claim 3 wherein said bonding/non-wetting agent is a fluorocarbon material.
9. The bifunctional gas diffusion electrode of claim 4 wherein said expanded metal is selected from a group consisting of nickel, cobalt, magnesium, gold, silver, chromium, iron, steel, and combinations thereof.
10. The bifunctional gas diffusion electrode of claim 8 wherein said fluorocarbon material is polytetrafluoroethylene.
11. The bifunctional gas diffusion electrode of claim 3 further comprising: at least one secondary composite layer permeable to an electrolyte, each of such secondary layer having
 (a) at least two hydrophilic plies having low-surface-area carbon particles and having high-surface-area carbon particles and having a discharge catalyst and having a bonding/non-wetting agent and having an oxygen evolution catalyst; and
 (b) a hydrophobic ply interposed between said at least two hydrophilic plies said hydrophobic ply having at least one current collector containing voids and having a hydrophobic admixture formed into said at least one current collector; and said admixture composed of
  i. low-surface-area carbon particles,
  ii. a discharge catalyst, and
  iii. a bonding/non-wetting agent.
12. The bifunctional gas diffusion electrode of claim 11 wherein said hydrophobic admixture of said hydrophobic ply of said secondary layer contains fissures.
13. The bifunctional gas diffusion electrode of claim 12 further comprising: a hydrophilic impregnate contained in said fissures of said hydrophobic ply of said secondary layer; and said hydrophilic impregnate composed of
 (a) low-surface-area carbon particles,
 (b) high surface-area carbon particles,
 (c) a discharge catalyst,

(d) a bonding/non-wetting agent,
(e) an oxygen evolution catalyst, and
(f) an organic dispersion agent.

14. The bifunctional gas diffusion electrode of claim 13 wherein said at least one current collector of said secondary layer is comprised of expanded metal.

15. The bifunctional gas diffusion electrode of claim 13 wherein said discharge catalyst of said secondary layer is selected from a group consisting of silver, nickel and platinum.

16. The bifunctional gas diffusion electrode of claim 13 wherein said low oxygen over-voltage metal additive of said secondary layer is selected from the group of material consisting of nickel sulfide, a tungsten carbide and cobalt mixture, iron tungstate, and mixtures thereof.

17. The bifunctional gas diffusion electrode of claim 13 wherein said organic dispersion agent of said secondary layer is a non-ionic surfactant.

18. The bifunctional gas diffusion electrode of claim 13 wherein said bonding/non-wetting agent of said secondary layer is a fluorocarbon material.

19. The bifunctional gas diffusion electrode of claim 14 wherein said expanded metal of said secondary layer is selected from a group consisting of nickel, cobalt, magnesium, gold, silver, chromium, iron, steel and combinations thereof.

20. The bifunctional gas diffusion electrode of claim 18 wherein said fluorocarbon material of said secondary layer is polytetrafluoroethylene.

21. A metal/air cell comprising:
a metal electrode;
at least one bifunctional gas diffusion electrode spaced apart from said metal electrode;
an alkali hydroxide electrolyte in contact with said metal electrode; and
said bifunctional gas diffusion electrode having
(a) at least one primary composite layer permeable to an electrolyte each of said primary layer having
  i. a first hydrophobic ply having low-surface-area carbon particles and having a discharge catalyst and having an oxygen evolution catalyst and having a bonding/non-wetting agent;
  ii. a second hydrophobic ply having low-surface-area carbon particles and having a bonding/non-wetting agent; and
  iii. a third hydrophobic ply interposed between said first and said second hydrophobic plies said third ply having at least one current collector containing voids and having a hydrophobic admixture formed into said at least one current collector and said hydrophobic admixture composed of
    a. low surface-area carbon particles,
    b. a discharge catalyst, and
    c. a bonding/non-wetting agent;
(b) at least one secondary composite layer permeable to an electrolyte each of said secondary layer having at least two hydrophilic plies each of said at least two hydrophilic plies having low-surface-area carbon particles and having high-surface-area carbon particles and having a discharge catalyst and having a bonding/non-wetting agent and having an oxygen evolution catalyst and each of said secondary layer having a hydrophobic ply interposed between said at least two hydrophilic plies said hydrophobic ply having at least one current collector containing voids and having a hydrophobic admixture formed into said at least one current collector and said hydrophobic admixture composed of
  i. low-surface-area carbon particles,
  ii. a discharge catalyst, and
  iii. a bonding/non-wetting agent;
(c) said hydrophobic admixture of said hydrophobic plies of said primary layer and said secondary layer containing fissures;
(d) said fissures of said primary layer and said secondary layer containing a hydrophilic impregnate;
(e) said hydrophilic impregnate having low-surface-area carbon particles and having high-surface-area carbon particles and having a discharge catalyst and having a bonding/non-wetting agent and having an oxygen evolution catalyst and having an organic dispersion agent;
(f) said at least one current collector of said primary layer and said secondary layer is an expanded metal selected from a group consisting of nickel, cobalt, magnesium, gold, silver, chromium, iron, steel and combinations thereof;
(g) said discharge catalyst of said primary and said secondary layer is selected from a group consisting of silver, nickel and platinum;
(h) said low oxygen over-voltage metal additive of said primary layer and said secondary layer is selected from the group of material consisting of nickel sulfide, a tungsten carbide and cobalt mixture, iron tungstate, and mixtures thereof;
(i) said organic dispersion agent of said primary layer and said secondary layer is a non-ionic surfactant; and
(j) said bonding/non-wetting agent of said primary layer and said secondary layer is polytetrafluoroethylene.

22. The metal/air cell of claim 21, where the metal electrode is selected from the group consisting of zinc, cadmium, iron, and aluminum.

* * * * *